US006801984B2

(12) United States Patent
Arimilli et al.

(10) Patent No.: US 6,801,984 B2
(45) Date of Patent: Oct. 5, 2004

(54) IMPRECISE SNOOPING BASED INVALIDATION MECHANISM

(75) Inventors: Ravi Kumar Arimilli, Austin, TX (US); John Steven Dodson, Pflugerville, TX (US); Guy Lynn Guthrie, Austin, TX (US); Jerry Don Lewis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 09/895,119

(22) Filed: Jun. 29, 2001

(65) Prior Publication Data

US 2003/0005236 A1 Jan. 2, 2003

(51) Int. Cl.[7] .............................................. G06F 12/08

(52) U.S. Cl. ....................... 711/146; 711/124; 711/144

(58) Field of Search ................................ 711/120, 121, 711/124, 141, 144, 146

(56) References Cited

U.S. PATENT DOCUMENTS

| | | | | |
|---|---|---|---|---|
| 5,761,724 A | * | 6/1998 | Jhon et al. | 711/141 |
| 5,778,437 A | * | 7/1998 | Baylor et al. | 711/141 |
| 5,787,477 A | * | 7/1998 | Rechtschaffen et al. | 711/141 |
| 5,829,035 A | * | 10/1998 | James et al. | 711/141 |
| 6,275,907 B1 | * | 8/2001 | Baumgartner et al. | 711/143 |

* cited by examiner

*Primary Examiner*—Gary Portka
(74) *Attorney, Agent, or Firm*—Casimer K. Salys; Dillon & Yudell LLP

(57) ABSTRACT

A method, system, and processor cache configuration that enables efficient retrieval of valid data in response to an invalidate cache miss at a local processor cache. A cache directory is provided a set of directional bits in addition to the coherency state bits and the address tag. The directional bits provide information that includes a processor cache identification (ID) and routing method. The processor cache ID indicates which processor's operation resulted in the cache line of the local processor changing to the invalidate (I) coherency state. The routing method indicates what transmission method to utilize to forward the cache line, from among a local system bus or a switch or broadcast mechanism. Processor/Cache directory logic provide responses to requests depending on the values of the directional bits.

26 Claims, 5 Drawing Sheets

IMPRECISE SNOOPING BASED INVALIDATION MECHANISM

BACKGROUND OF THE INVENTION

1. Technical Field

The present invention relates to data processing systems and in particular to memory systems of a multiprocessor data processing system. Still more particularly the present invention relates to a method and system for providing more efficient operation of caches in a multiprocessor data processing system.

2. Description of the Related Art

A data-processing system typically includes a processor coupled to a variety of storage devices arranged in a hierarchical manner. In addition to a main memory, a commonly employed storage device in the hierarchy includes a high-speed memory known as a cache memory. A cache memory speeds up the apparent access times of the relatively slower main memory by retaining the data or instructions that the processor is most likely to access again, and making the data or instructions available to the processor at a much lower latency. As such, cache memory enables relatively fast access to a subset of data and/or instructions that were recently transferred from the main memory to the processor, and thus improves the overall speed of the data-processing system.

In a conventional symmetric multiprocessor (SMP) data processing system, all of the processors are generally identical, insofar as the processors all utilize common instruction sets and communication protocols, have similar hardware architectures, and are generally provided with similar memory hierarchies. For example, a conventional SMP data processing system may comprise a system memory, a plurality of processing elements that each include a processor and one or more levels of cache memory and a system bus coupling the processing elements to each other and to the system memory. Many such systems include at least one level of cache memory shared between two or more processors and which support direct processor cache to processor cache transfer of data (or intervention). To obtain valid execution results in a SMP data processing system, it is important to maintain a coherent memory hierarchy, that is, to provide a single view of the contents of memory to all of the processors.

During typical operation of a cache hierarchy that supports intervention among processor caches, a cache line that is sort to be modified is requested via an address broadcast mechanism that utilizes the system bus/interconnect (i.e., the address of the cache line is sent out to all the caches). As the number of processors that make up the multiprocessor system increased, a switch-based configuration was utilized in place of the traditional bus configuration to connect the processors to each other. Utilization of a switch enables inter-processor (or processor group) operations (e.g., requests, command, etc.) to be sent directly (i.e., without a broadcast to the entire system).

The size of multiprocessor systems, particularly the number of processors and/or processor groups, is continually increasing. For example, an 8-way processing system may be interconnected to seven other similar 8-way processing systems to create a 64-way processing system with 8 independent processing nodes. In addition to the increase in the number of processors and processor speeds, increases in the size of caches and resulting longer latency for coherency operations transacted on the cache led to the creation and utilization of cache directories and the implementation of directory-based cache coherency. Accordingly, each memory/cache component comprises a memory/cache directory, which is primarily utilized for reducing snoop response times and maintaining cache coherency more efficiently.

A coherent memory hierarchy is maintained through the use of a selected memory coherency protocol, such as the MESI protocol. In the MESI protocol, an indication of a coherency state is stored in association with each coherency granule (i.e., cache line) of at least all upper level (cache) memories. Each coherency granule can have one of four states, modified (M), exclusive (E), shared (S), or invalid (I), which can be encoded by two bits in the cache directory. Those skilled in the art are familiar with the MESI protocol and its use to ensure coherency in memory operations.

Each cache line (block) of data in a SMP system, typically includes an address tag field, a state bit field, an inclusivity bit field, and a value field for storing the actual instruction or data. In current processing systems, both the address tag field and the state bit field are contained in the cache directory. This cache directory may be organized under any caching scheme available, such as fully associative, direct mapped, or set-associative, as are well-known in the art. The tag within the address tag field may be a full address for a fully associative directory, or a partial address for a direct-mapped directory or a set-associative directory. The bits within the state bit field are utilized to maintain cache coherency for the data-processing system.

FIG. 2 illustrates a cache with associated cache directory according to current processor designs. Cache 201 comprises 64 cache lines consecutively numbered 0–63. As illustrated in FIG. 2, cache 201 has associated cache directory 203, which consists of address tag and coherency state bits. The address tag is a subset of the full address of the corresponding memory block. During operation, a compare match of an incoming address with one of the tags within the address tag field indicates a cache "hit" if the entry is in a valid state. If no compare match occurs or the entry is in the invalid (I) state then a cache "miss" occurs.

Improvements in silicon technology, etc. have resulted in the increase in cache sizes and thus, the amount of data each cache is able to hold. Subsequently, very few cache misses occur that are caused because the requested data is not present in the local processor cache. Rather, those misses which occur today are primarily due to invalidates, i.e., the local cache line exists in the I coherency state. Local cache misses are thus more likely to occur due to snooped "invalidation" operations than due to the cache not having the data.

Typically, a bus "snooping" technique is utilized to invalidate cache lines during cache coherency operation. Each cache performs a snooping operation by which changes to cache lines that are sent on the system bus are reflected within the local cache in order to maintain coherency amongst the caches. For example, whenever a read or write is performed, the address of the data is broadcast from the originating processor core to all other caches sharing a common bus (or connected via a switch). Each cache snoops the address from the bus and compares the address with an address tag array in the cache directory. If a hit occurs, a snoop response is returned which triggers a coherency operation, such as invalidating the hit cache line, in order to maintain cache coherency.

When a local cache miss occurs, the requesting processor typically broadcasts the request by sending the address out to the system bus (or switch). A snoop response of "retry" is issued from a cache with the valid data when the cache has a modified copy of the data that must first be pushed out of the cache or when there was a problem that prevented appropriate snooping. In the case of a retry response, the processor from which the request originated will retry the read or write operation until the data is received. The processor is forced to broadcast the retry because no information is available as to which processor/cache has a valid copy of the requested data. This often leads to a large number of retry operations that utilizes significant bus resources and degrades overall processor speed and performance (i.e., long latencies/coherency resolution and high retry penalties).

The present invention recognizes that, in light of technological improvements (i.e., larger caches and increased processor speeds) and the subsequent increased occurrence of cache misses due primarily to invalidates, it would be desirable to provide a method and system that allows a processor to quickly retrieve correct data when an invalidate is encountered for a desired cache line. A system, method, and processor cache configuration that reduces the incident of re-tries from a processor node in response to a cache miss caused by an invalidated cache line would be a welcomed improvement. These and other benefits are provided by the present invention described herein.

SUMMARY OF THE INVENTION

Disclosed is a method, system, and processor cache configuration that enables efficient retrieval of valid data in response to an invalidate cache miss at a local processor cache. A cache directory is enhanced by appending a set of directional bits in addition to the coherency state bits and the address tag. The directional bits provide information that includes the processor cache identification (ID) and routing method. The processor cache ID indicates which processor operation resulted in the cache line of the local processor changing to the invalidate (I) coherency state. The processor operation may be issued by a local processor or by a processor from another group or node of processors if the multiprocessor system comprises multiple nodes of processors. The routing method indicates what transmission method to utilize to forward a request for the cache line. The request may be forwarded to a local system bus or directly to another processor group via a switch or broadcast mechanism. Processor/Cache directory logic is provided to set and interpret the values of the directional bits and provide responses depending on the values of the bits.

During operation, a snooping processor causes the cache state of the snooped cache line to be set to invalid. When a local processor, i.e., a processor associated with the snooped cache, issues a request for the cache line, the local processor reads the invalid coherency state of the cache line from the cache directory. The cache directory logic then reads the directional bits and forwards the request to the specific processor (or cache) indicated by the identification bits via the routing mechanism indicated by the routing bits.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1A:
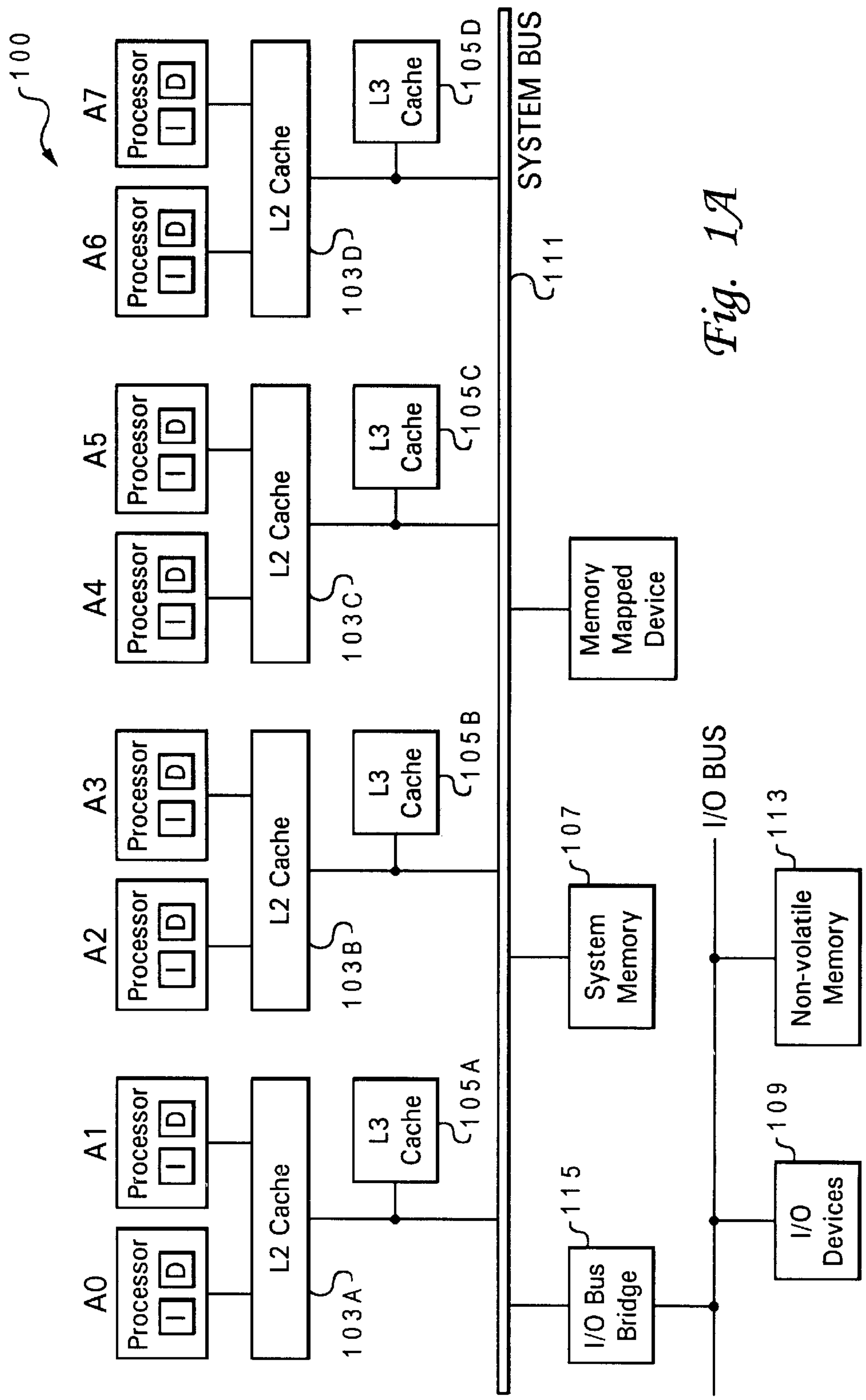
FIG. 1A illustrates an 8-way multiprocessor data processing system with a bus topology.
Figure 1B:
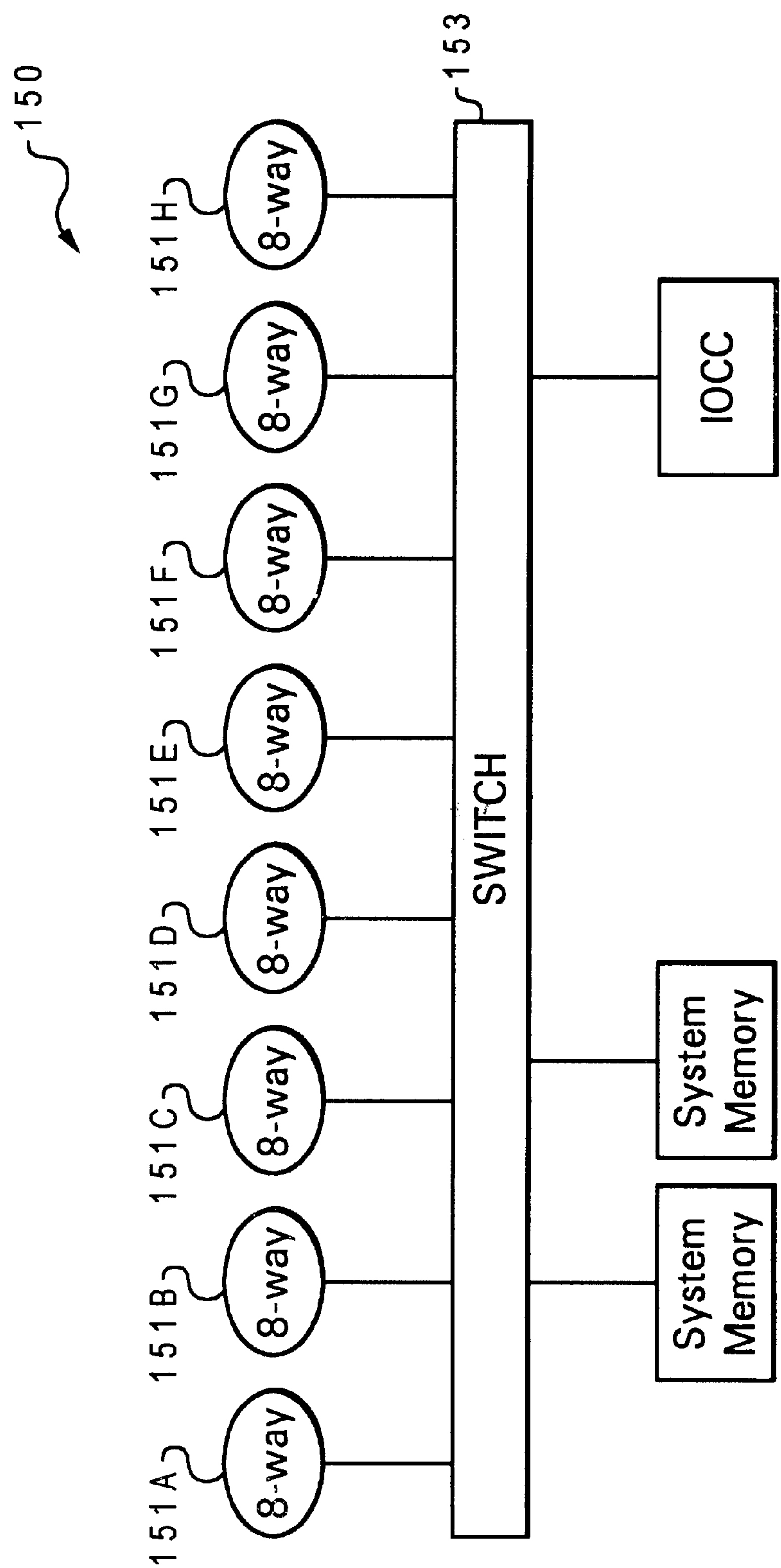
FIG. 1B illustrates a 64-way multiprocessor data processing system comprised of eight 8-way multiprocessor systems of FIG. 1A interconnected via a switch topology.
Figure 2:
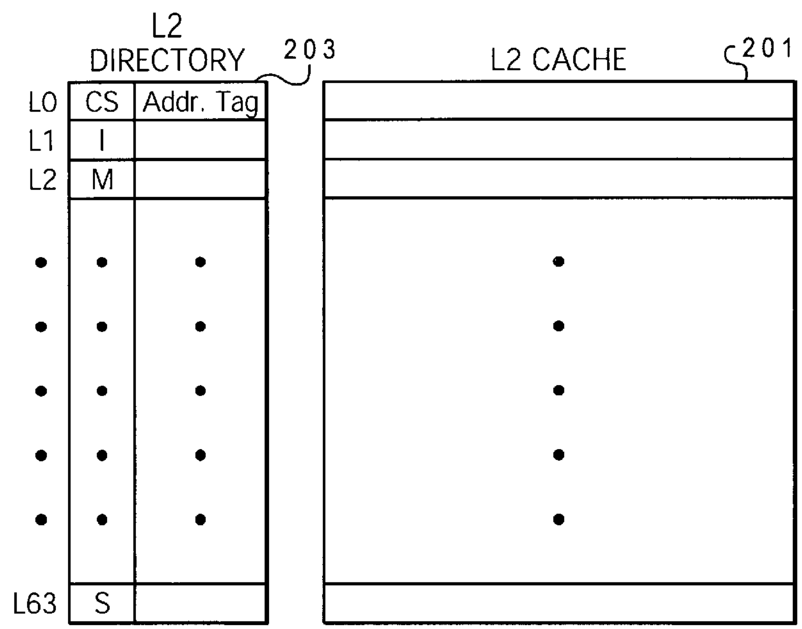
FIG. 2 illustrates an L2 cache and associated directory according to the prior art.

With reference now to the figures, and in particular with reference to FIGS. 1A and 1B, there are illustrated high level block diagrams of multiprocessor data processing systems in which preferred embodiments of the invention may be implemented. As shown, data processing system 100 of FIG. 1A is an 8-way multiprocessor system with the processors A0–A7 connected via a bus topology. Each processor comprises internal, level one (L1) caches (instruction and data caches) and each processor is coupled to an external, level two (L2) cache 103A–103D. L2 caches 103A–103D are utilized to stage data to L1 caches. In other words, L2 caches 103A–103D function as intermediate storage between system memory 107 and L1 caches, and, according to the preferred embodiment are able to store a large amount of data to prevent the occurrence of cache misses due to data not being in the cache.

Although L1 caches are illustrated in FIG. 1A as bifurcated (or separated) instruction and data cache, those skilled in the art will appreciate that each bifurcated set of L1 caches could alternatively be implemented as a single L1 cache. Lower level look-aside (L3) caches 105A–105D are also illustrated. Processors A0–A7 are grouped in pairs, and a processor group (e.g., A0 and A1) communicates with another processor group (A2 and A3) via a system bus 111, which also provides interconnection for system memory 107 and I/O devices 109, etc. I/O devices 109 and non-volatile memory 113 are interconnected to system bus 111 via a bus bridge 115.

System bus 111, which may comprise one or more buses serves as a conduit for communication transactions between L2 caches 103A–103D, system memory 107, I/O devices 109, and nonvolatile storage 113. A typical communication transaction on system bus 111 includes a source tag indicating the source of the transaction, a destination tag specifying the intended recipient of the transaction, an address, and sometimes data. Each device coupled to system bus 111 preferably snoops all communication transactions on system bus 111 to determine if the coherency of the device should be updated for the transaction. Preferably an external snoop path from each cache to the system bus 111 is provided.

According to the preferred embodiment, data processing system 100 preferably comprises large local (L2) caches 105A–105D, which substantially eliminates the occurrence of cache misses due to no data being present. Also, in the preferred embodiment, the caches of data processing system 100 each comprises an enhanced directory (described below), by which functional elements of the invention are provided.

FIG. 1B illustrates a 64-way multiprocessor data processing system 150 comprising eight (8) of data processing system 100 interconnected via a switch 153. As depicted, 64-way data processing system 150 is a symmetric multiprocessor (SMP) with each 8-way processor 151A–151H represented as a node. In addition to the conventional registers, instruction flow logic and execution units utilized to execute program instructions, each of the processor cores (e.g., A0–A7) also includes logic (and/or a snoop response and directional utility) which directs the functional aspects of the invention. In the preferred embodiment, this logic is included within the coherency protocol and/or the operating system's (OS) code.

Figure 3:
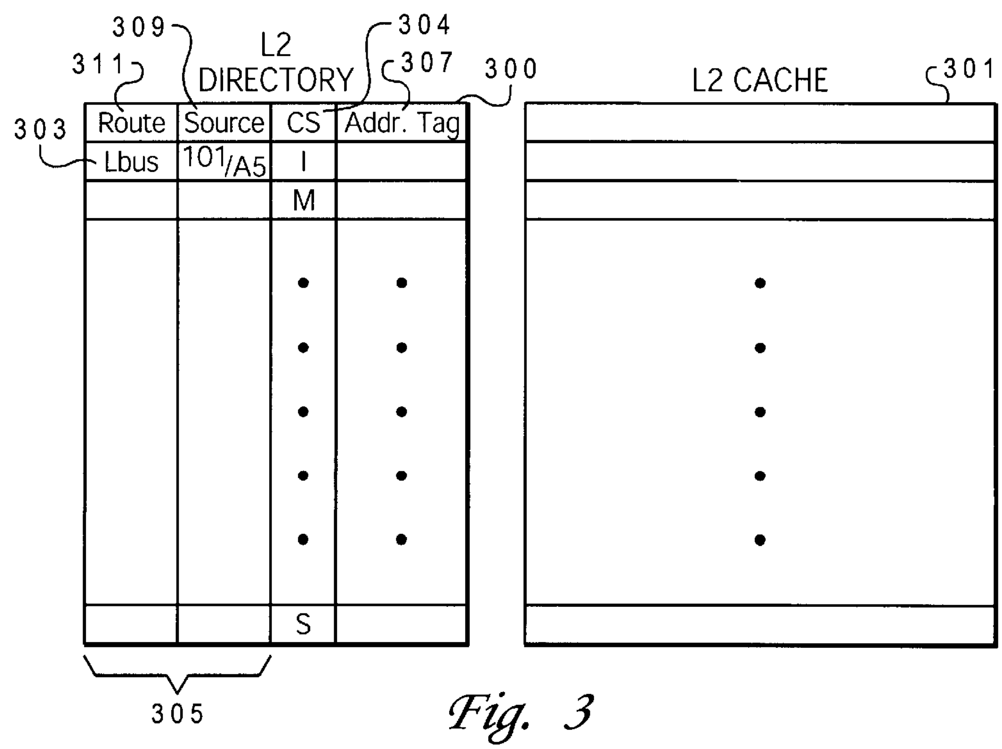
FIG. 3 illustrates an L2 cache and associated directory with "directional" bits in accordance with a preferred embodiment of the invention.

FIG. 3 illustrates a cache 301 and associated enhanced cache directory 300 according to a preferred embodiment of the invention. The present invention adds a series of directional bits 305 to the cache directory 300 and provides associated processor/cache logic for updating the value of these bits and utilizing the value of the bits to identify the location of valid data (or cache line) to a requesting processor, whose copy of the data in the local cache is in the I state. For example, when a Dclaim is issued by Processor node 151E of FIG. 1B to cache line A of the cache of Processor node 151A, the directory entry of cache line A, as it exists in Processor Node 151A, is set to invalid (I) according to the normal coherency response. Simultaneously, the directional bits of the cache line are set to reflect the number (or identifier) of the processor and/or processor node group (i.e., 5 or 101 binary) that caused the invalidation of the cache line A. The operations being snooped on the system bus include the identification information of the processor and processing group. For example, the group ID may be an 8-bit tag, while the processor ID may be a 3-bit tag. In the preferred embodiment, only the processor ID is stored in the directional bits; however, when the processor belongs to another processor group, the processor group ID may also be stored within the directional bits.

In the illustrative embodiment, enhanced cache directory 300 comprises 64 rows of data, each corresponding to a cache line within the associated cache 301. Within each row of data, as shown by exemplary directory entry 303, is the cache state 304 for the particular cache line (e.g., M, E, S, I) and the address tag 307 of the cache line. Also associated (added) to each directory entry 303 is a set of direction bits, "invalidation source" 309 and "routing method" 311 that are utilized to (1) point to the processor or processor group/node in whose cache the valid copy of the requested cache line exists and (2) direct the requesting processor how to forward the request, respectively. Exemplary directory entry 303 contains an invalid cache state (I), and invalidation source 309 is set to 101 indicating that an operation of the $5^{th}$ processor group caused the local cache line to go to the invalid state and therefore holds a valid copy of the data. Simultaneously, routing method 311 is set to 00 indicating that the request should be sent out to the local system bus. The various processes are further described below in FIGS. 4A and 4B.

Thus, as described above, in the preferred embodiment the directory is expanded to include the directional bits 305. The instruction set architecture (ISA) is not changed, but additional processor/cache logic is provided that first sets the value of the directional bits and also checks the value of the directional bits whenever an invalidate miss occurs to determine which processor node to forward the request to. In another embodiment, the coherency protocol is modified to permit reading of the processor ID from the request on the system bus 111 and setting of the directional bits 305 whenever the snoop results in the invalidation of the cache line. The snoop operation has a tag with the ID of the snooped processor and sets the directional bits 305 when the coherency state is updated. Other means of setting the directional bits 305 are contemplated within the operation of the invention.

Whenever the requesting processor desires the locally invalidated cache line, the processor sends a directed address to the processor node represented by the invalidation source bits 309. According to the preferred embodiment, if the corresponding node does not contain the cache line, the address is broadcasted and/or directed to memory depending on the system design.

In one embodiment, each request issued on the system bus 111 is tagged to indicate its specific processor ID, which is then read off whenever a cache line is invalidated. Modifications to current system configuration may thus be required, although the invention may be completed utilizing current identification data within the request (origination source, etc.).

The invention may comprise utilization of the invalidation source bit only; however, in a preferred embodiment, illustrated in FIG. 3, the additional routing bits, "invalidation source routing method" 311 (or routing method 311) is also provided within the directory and, together with the invalidation source 309, provides the directional bits.

Routing method 311 specifies the route to be taken to get from the present cache to the cache holding the valid data. Processor logic may, responsive to the source route provided, modify the request to enable the request to be forwarded according to the indicated method. With the switch topology, the request may then be transmitted directly to the cache that holds the valid cache line. Thus, the invention provides information on which node or processor cache has the valid cache line and also how (i.e., which route to utilize) to forward the request to the particular node or processor cache.

Thus, routing method 311 may take on a plurality of values depending on the number of processor groups and their connectivity. Thus, if there are multiple processor groups, there routing method 311 may be utilized to indicate a directed broadcast to a particular group if connectivity between the processor groups is via a switch or the value of the routing method 311 may indicate that a general broadcast is required on the system bus if the connectivity is via a bus interconnect. Further, routing method 311 may specify within each of the above possibilities if the request is directed or broadcast within a specific group. Accordingly, routing method 311 may take on the following values:

00 local broadcast on local interconnect 01 local direct to specific processor 10 remote broadcast on system bus 11 remote directed to specific group and specific processor The actual configuration of the processing system determines which of the options are actually available.

Figure 4A:
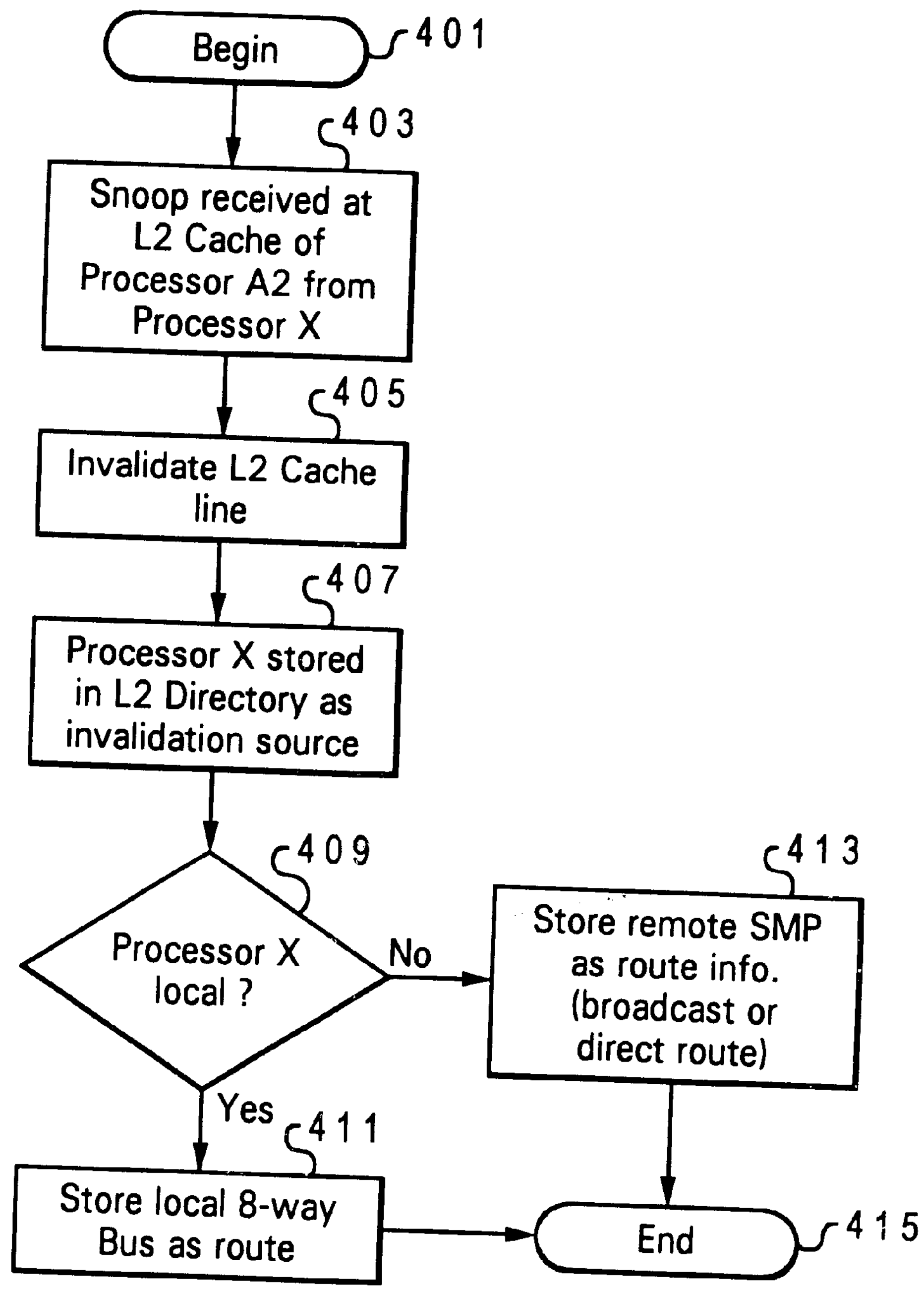
FIG. 4A illustrates a flow chart of the process of setting the directional bits of the cache directory in accordance with a preferred embodiment of the invention.

FIG. 4A illustrates the process by which the directional bits of the cache directory are set. The process begins at block 401 and then commences to block 403 where a first processor (e.g., Processor A2) snoops an operation from a second processor (e.g., Processor A5) for a cache line within L2 cache of the first processor. Following the snoop of the operation, the cache line of L2 cache is invalidated (i.e., coherency state set to I) as shown at block 405. Then, the invalidation source bits are set to reflect the identification code for the second processor as indicated at block 407. A determination is then made at block 409 whether the snooped processor is a local processor (i.e., a processor on the same node as the snooped processor). If the snooped processor is a local processor, the routing bits are set to indicate route via local 8-way bus as indicated at block 411. Otherwise, the code for transmission to "remote processor" is stored as the route as indicated at block 413 indicating that a broadcast or directed external route (i.e., via the switch) is to be utilized. The process then ends as shown at block 415.

A specific example is now provided utilizing processor A2 and local processor A5 as the snooping and snooped processors respectively. Processor A2's L2 cache has to invalidate an active cache line due to a snoop of an operation from Processor A5. Invalidation source bit is stored as A5 and source route is stored as the local 8-way bus. When A2 needs to acquire the cache line again, L2 cache directs the bus interface unit (BUI) to route the address locally first. If the L2 cache of Processor A5 has the active/valid cache line, the data is provided locally without going to through the switch. If not, the address is then broadcasted and the data returned from the new source.

In another example, Processor A2's L2 cache has to invalidate an active cache line due to a snoop from non-local Processor G3. Invalidation source is stored as "G3" and the source route is stored as "remote SMP G." Re-acquiring the cache line can now be done by either broadcasting the address or routing the address directly to SMP G to save on address bandwidth.

Figure 4B:
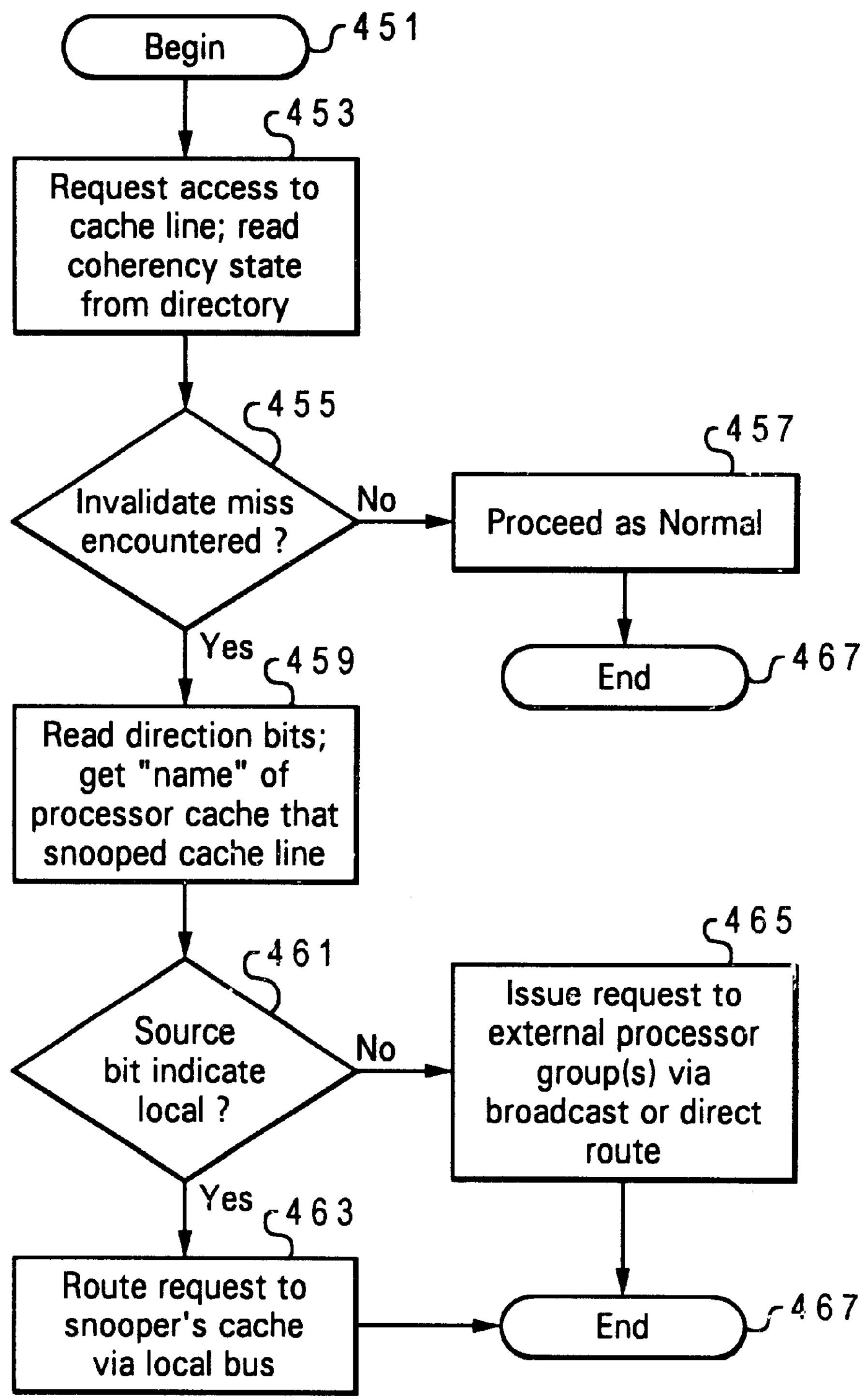
FIG. 4B illustrates a flow chart of the process of directly locating valid data of an invalidated cache line utilizing the directional bits in accordance with a preferred embodiment of the invention.

FIG. 4B illustrates the process of requesting a cache line that has been invalidated. The process begins at block 451 and thereafter proceeds to block 453 which illustrates a processor request for a cache line in its L2 cache. A determination is made at block 455 whether an invalidate cache miss occurs (i.e., whether the coherency bit of the cache line requested is set to I). If there is not an invalidate cache miss, the request process proceeds as normal as shown at block 457. If, however, an invalidate cache miss occurs, the directional bits are read as shown at block 457. A determination is then made at block 461 whether the routing bit indicates a local snooper. If the routing bit indicates a local processor's operation was snooped, the request is forwarded to the snooping processor via the local 8-way system bus as illustrated at block 463. If, however, the routing bit does not indicate a local processor's operation was snooped, the request is routed to the external node directly via a switch or indirectly via a broadcast on the system bus as shown at block 465. Then the process ends as shown at block 467.

In one embodiment, the directory may comprise information based on the relative distance from the requesting cache of all other cache's that hold valid data (e.g., data shared among multiple caches). According to this embodiment, assuming there is shared data in a local cache (or multiple nodes), which is the same as data in a remote cache whose operation was snooped, the processing logic of the invention selects the closest cache and stores that cache's ID and routing information in the directional bits.

For example, if the local processor A2 shares a cache line with remote processor G3 and G3 issues an operation that invalidates the cache line of local processor A2, the directional bits are set to reflect G3 (and appropriate global system routing method). Assuming processor A4 of local processor group later acquires a copy of the modified cache line in G3, local processor A2 would snoop this transaction and update its directional bits to reflect A4 (and appropriate local system routing method). Thus, local processor A2 continues to snoop operations and update its directional bits accordingly. Thus, it is not necessary for local processor A2 to snoop every operation, and the directional bits are updated solely for those operations that are snooped.

Use of the directional bits thus provides an imprecise tracking mechanism for snoop operations, and the snoop operations are not retried. The invention provides an imprecise, direct address mechanism for a multi-way SMP by dynamically routing the next request to the processor group or node of the last processor whose bus transaction invalidated the cache line. Then, according to one embodiment, a sweep of the specific group may be completed to determine which processor has the cache line modified. The storage of the invalidation source 309 and routing method 311 is imprecise because the cache that owns the invalid line cannot snoop all transfers. Thus, in the preferred embodiment, since the process is imprecise, retries are not issued when the local processor request sent to the remote processor indicated by the directional bits does not receive a clean response or misses at the cache of the remote processor. Statistically, this occurs very infrequently and the cache is able to acquire the line most efficiently for the system. The invention allows the development of larger SMPs with faster operation due to the elimination (or substantial reduction) of global retries on the system bus by providing somewhat precise histories across different snoopers. Less time is spend retrieving information/data and performance of the system is improved.

In a related embodiment, when shared data is present in two or more remote nodes, the broadcast is directed to only those nodes that contain the address block in their local caches. This helps to determine how far up and down the cache blocks to send a request.

While the invention has been particularly shown and described with reference to a preferred embodiment, it will be understood by those skilled in the art that various changes in form and detail may be made therein. It is therefore contemplated that such modifications can be made without departing from the spirit or scope of the present invention as defined in the appended claims.

What is claimed is:

1. A method for providing directed system response to an invalidation miss at a local processor cache of a data processing system having a plurality of processors, said method comprising:

providing directional bits for a cache line within a cache directory of said local processor cache, wherein said directional bits includes at least one source bit that is utilized to store an identifier (ID) of one of said plurality of processors and at least one route bit that is utilized to indicate a transfer method from among multiple transfer methods for forwarding a request for said cache line;

in response to a snoop of an operation that causes a coherency state of said cache line in said local processor cache to go invalid, setting a value of said directional bits to indicate a processor ID associated with an origination processor that issued said operation; and responsive to a request for said cache line by an associated local processor, immediately forwarding said request to a processor indicated by said processor ID via a transfer method indicated by said at least one route bit, whereby said request is forwarded to said origination processor.

2. The method of claim 1, wherein said immediately forwarding step includes first retrieving said processor ID and said routing information from said plurality of bits.

3. The method of claim 1, wherein said multiprocessor data processing system comprises at least two nodes of processor groups, and said forwarding of said request includes:

first determining that said origination processor belongs to a local processor group that includes said local processor; and in response to said determining step, setting said value of said at least one route bit to indicate forwarding via a local transmission method.

4. The method of claim 3, wherein when said local processor is connected via a switch to other processors within said local processor group, said request is forwarded directly to said origination processor, and when said local processor is connected via a local system bus, said request is broadcasted on said local system bus.

5. The method of claim 3, further comprising setting said value of said route bit to indicate a global, system-wide bus broadcast when said origination processor does not belong to said local group.

6. The method of claim 3, further comprising setting said value of said routing bit(s) to indicate a directed, system-wide bus broadcast when said origination processor does not belong to said local group and said processor groups are connected via a switch, wherein a specific processor from another processor group is sent the request directly.

7. The method of claim 3, further comprising, responsive to a cache miss when said request is transmitted directly to said origination processor, issuing said request to said global system bus.

8. The method of claim 1, wherein said forwarding further includes:

when more than one processor has a valid copy of the cache line, identifying which processor among the more than one processor is a closest processor;

storing an ID of the closest processor having a valid copy of said cache line within said source bit; and forwarding said request to said closest processor, wherein said cache line is source from the processor that is closest to the requesting processor reducing a response latency.

9. A multiprocessor data processing system that provides directed addressing of cache intervention in response to an invalidate, comprising:

a plurality of processors, each processor having an associated cache that supports intervention;

logic associated with a cache directory of at least one local processor cache that responsive to a snoop of an operation from a first processor that invalidates a cache line of said local processor cache:

(1) updates a directory entry of said cache line to include a processor identifier (ID) of first processor, which issued said operation; and (2) provides at least one route bit with source routing information for said directory entry that is utilized to indicate a transfer method from among a plurality of different transfer methods for forwarding a subsequent request from a second processor for said cache line; and wherein said logic responsive to a subsequently snooped request from a second processor to access said cache line, immediately directs said request to a processor indicated by said processor ID via a transfer method indicated by said source routing information, whereby said request is forwarded to said first processor.

10. The multiprocessor data processing system of claim 9, wherein said plurality of processors includes at least two nodes of processor groups, and said logic further comprises:

means for first determining that said first processor belongs to a local processor group that includes said local processor; and means, responsive to said determining step, for setting said value of said at least one route bit to indicate forwarding via a local transmission method.

11. The multiprocessor data processing system of claim 10, wherein when said local processor is connected via a switch to other processors within said local processor group, said request is forwarded directly to said first processor, and when said local processor is connected via a local system bus, said request is broadcasted on said local system bus.

12. The multiprocessor data processing system of claim 10, wherein said logic further comprises means for setting said value of said route bit to indicate a global, system-wide bus broadcast when said first processor does not belong to said local group.

13. The multiprocessor data processing system of claim 10, wherein said logic further comprises means for setting said value of said routing bit(s) to indicate a directed, system-wide bus broadcast when said first processor does not belong to said local group and said processor groups are connected via a switch, wherein a specific processor from another processor group is sent the request directly.

14. The multiprocessor data processing system of claim 11, wherein said logic further comprises means, responsive to a cache miss when said request is transmitted directly to said first processor, for issuing said request to said global system bus.

15. The multiprocessor data processing system of claim 9, wherein said logic for directing said request further includes:

logic, when more than one processor has a valid copy of the cache line, for identifying which processor among the more than one processor is a closest processor;

logic for storing an ID of the closest processor having a valid copy of said cache line within said source bit; and forwarding said request to said closest processor, wherein said cache line is source from the processor that is closest to the requesting processor reducing a response latency.

16. A memory subsystem of a multiprocessor data processing system comprising:

a memory;

a plurality of caches associated with processors of said multiprocessor data processing system that comprise cache lines in which data is stored;

a plurality of cache directories each affiliated with a particular one of said plurality of caches, wherein each entry of said cache directory includes a coherency state for each cache line within said particular cache, an address tag, and directional bits, which include: (1) processor ID of an origination processor whose cache contains a valid copy of data when said coherency state of said cache line is the invalidate state, wherein an operation that caused said cache line to be invalidated was issued by the origination processor; and (2) routing bit(s) with source routing information for a directory entry that is utilized to indicate a transfer method for forwarding a request for said cache line; and logic, responsive to a receipt of a request for said cache line, for forwarding a request for said cache line from an associated local processor to an origination processor indicated by said directional bits utilizing the transfer method indicated by said source routing information.

17. The memory subsystem of claim 16, wherein said logic includes:

means, responsive to a snoop of an operation that invalidates a cache line of said local processor cache, for updating a directory entry of said cache line to include a processor identifier (ID) of the origination processor, which issued said operation; and means, responsive to a later request from a local processor to access said cache line, for immediately forwarding said request to a processor indicated by said processor ID, whereby said request is forwarded to said origination processor.

18. The memory subsystem of claim 16, wherein said multiprocessor data processing system comprises at least two nodes of processor groups, and said logic further includes:

means for first determining that said origination processor belongs to a local processor group that includes said local processor; and means, responsive to said determining step, for setting said value of said route bit(s) to indicate forwarding via a local transmission mechanism.

19. The memory subsystem of claim 18, wherein when said local processor is connected via a switch to other processors within said local processor group, said request is forwarded directly to said origination processor, and when said local processor is connected via a local system bus, said request is broadcasted on said local system bus.

20. The memory subsystem of claim 18, wherein said logic further comprises means for setting said value of said route bit(s) to indicate a global, system-wide bus broadcast when said origination processor does not belong to said local group.

21. The memory subsystem of claim 18, wherein said logic further comprises means for setting said value of said routing bit(s) to indicate a directed, system-wide bus broadcast when said origination processor does not belong to said local group and said processor groups are connected via a switch, wherein a specific processor from another processor group is sent the request directly.

22. The memory subsystem of claim 19, wherein said logic further comprises means, responsive to a cache miss when said request is transmitted directly to said origination processor, for issuing said request to said global system bus.

23. The memory subsystem of claim 22, wherein said forwarding means further includes:

means, when more than one processor has a valid copy of the cache line, for identifying which processor among the more than one processor is a closest processor;

means for storing an ID of the closest processor having a valid copy of said cache line within said source bit; and means for forwarding said request to said closest processor, wherein said cache line is source from the processor that is closest to the requesting processor reducing a response latency.

24. The method of claim 1, wherein:

the route bit indicates a transmission method and path assigned to the request; and said method and path ranges from a direct point-to-point request to the processor identified by the processor ID within the source bit, a localized broadcast request to a local bus, direct point-to-point (or targeted broadcast) of the request to a specific non-local processor, and a global broadcast request to the global data processing system bus, wherein each method and path is assigned a different value.

25. The data processing system of claim 9, wherein:

the route bit indicates a transmission method and path assigned to the request; and said method and path ranges from a direct point-to-point request to the processor identified by the processor ID within the source bit, a localized broadcast request to a local bus, direct point-to-point (or targeted broadcast) of the request to a specific non-local processor, and a global broadcast request to the global data processing system bus, wherein each method and path is assigned a different value.

26. The memory subsystem of claim 16, wherein:

the route bit indicates a transmission method and path assigned to the request; and said method and path ranges from a direct point-to-point request to the processor identified by the processor ID within the source bit, a localized broadcast request to a local bus, direct point-to-point (or targeted broadcast) of the request to a specific non-local processor, and a global broadcast request to the global data processing system bus, wherein each method and path is assigned a different value.

* * * * *